(12) United States Patent
Swanson et al.

(10) Patent No.: US 11,371,844 B2
(45) Date of Patent: Jun. 28, 2022

(54) SYSTEM AND METHOD FOR TILE CACHED VISUALIZATIONS

(71) Applicant: CNH Industrial America LLC., New Holland, PA (US)

(72) Inventors: Richard Swanson, Westmont, IL (US); Andrew Berridge, Burr Ridge, IL (US); Nicolas Peri, Grasse (FR)

(73) Assignee: CNH Industrial America LLC, New Holland, PA (US)

( * ) Notice: Subject to any disclaimer, the term of this patent is extended or adjusted under 35 U.S.C. 154(b) by 456 days.

(21) Appl. No.: 16/589,040

(22) Filed: Sep. 30, 2019

(65) Prior Publication Data

US 2021/0095963 A1    Apr. 1, 2021

(51) Int. Cl.
| | |
|---|---|
| *G01C 21/00* | (2006.01) |
| *A01D 75/00* | (2006.01) |
| *G06T 1/60* | (2006.01) |
| *G06F 3/04847* | (2022.01) |
| *H04L 67/12* | (2022.01) |
| *A01C 21/00* | (2006.01) |

(52) U.S. Cl.
CPC ............ *G01C 21/005* (2013.01); *A01C 21/00* (2013.01); *A01D 75/00* (2013.01); *G06F 3/04847* (2013.01); *G06T 1/60* (2013.01); *H04L 67/12* (2013.01)

(58) Field of Classification Search
CPC .... A01C 21/00; A01D 75/00; A01D 41/1278; G06F 3/04847; G06F 3/04817; G06T 1/60; G06T 17/05; H04L 67/12; H04L 67/1095; H04L 67/2842; A01B 69/008; A01B 79/005; G01C 21/3881
See application file for complete search history.

(56) References Cited

U.S. PATENT DOCUMENTS

2019/0138194 A1 *    5/2019    Ryan ................. G06F 16/958

* cited by examiner

*Primary Examiner* — Yuen Wong
(74) *Attorney, Agent, or Firm* — Rickard K. DeMille; Rebecca L. Henkel

(57) ABSTRACT

A system includes a vehicle system. The vehicle system includes at least one sensor and a mapping server system communicatively coupled to a mapping client system. The mapping server system is configured to receive a signal from the at least one sensor; update a mapping tile disposed in a tile cache to derive an updated mapping tile based on the signal; and visually display the mapping tile to an operator of the vehicle system.

14 Claims, 8 Drawing Sheets

SYSTEM AND METHOD FOR TILE CACHED VISUALIZATIONS

BACKGROUND

The invention relates generally to a visualization of data, and more specifically to visualizations via tile caching of data.

Certain vehicles may include visualizations useful for controlling the vehicle during certain operations. For example, certain construction vehicles, agricultural tractors, and the like, may include visualizations for vehicle speed, vehicle location, and the like. Generally, the vehicle, such as the agricultural tractor, may be operated in a field and visualizations such as speed, location, direction of travel, and so on, are useful in operating the vehicle in the field during farming operations. Tile caching systems provide for cached mapping data. It may be useful to improve tile caching systems for vehicle operations.

BRIEF DESCRIPTION

In one embodiment, a vehicle system includes at least one sensor and a communications system configured to receive one or more remote operations commands. The vehicle system further includes control system configured to execute a speed control system to control a speed of the vehicle system. The control system is further configured to execute an automatic adjustment teleoperations system to derive a filtered speed command based on the one or more remote operations commands and the at least one sensor, and to adjust the speed of the vehicle system based on the filtered speed command.

In another embodiment, a method includes receiving one or more remote operations commands via a communications system included in a vehicle system. The method further includes executing, via a control system included in the vehicle system, a speed control system to control a speed of the vehicle system. The method also includes executing, via the control system, an automatic adjustment teleoperations system to derive a filtered speed command based on the one or more remote operations commands and at least one sensor, and adjusting, via the control system, the speed of the vehicle system based on the filtered speed command.

In a further embodiment, a non-transitory, computer readable medium comprises instructions that when executed by a processor cause the processor to receive one or more remote operations commands via a communications system included in a vehicle system. The instructions further cause the processor to execute, via a control system included in the vehicle system, a speed control system to control a speed of the vehicle system. The instructions also cause the processor to execute, via the control system, an automatic adjustment teleoperations system to derive a filtered speed command based on the one or more remote operations commands and at least one sensor, and to adjust, via the control system, the speed of the vehicle system based on the filtered speed command.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
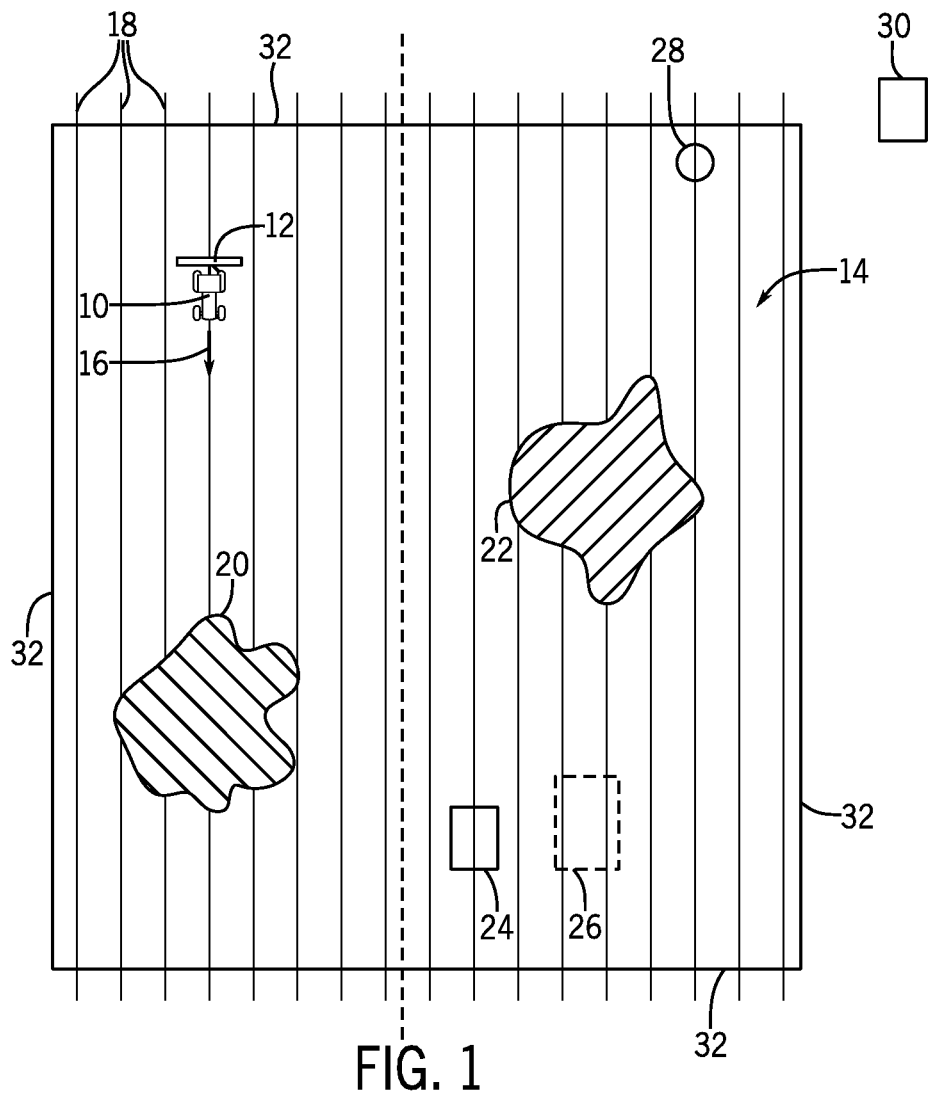
FIG. 1 is a schematic diagram of an embodiment of a teleoperated vehicle operating within an agricultural field.

Certain agricultural and other operations (mining, construction, and the like) may use an unmanned and/or manned vehicle such as a tractor or other vehicle. For agricultural operations, the vehicle may tow or include an agricultural implement such as a planter, seeder, fertilizer, and so on. In manned operations, the vehicle operation (either in-vehicle operator and/or remote vehicle operator) may use a map suitable for defining field boundaries, driving paths, planting locations, type of plantings, and the like. The vehicle may then be operated with aid of the map, for example, to traverse the field for planting, crop gathering, and so on.

In-vehicle mapping display systems may include less powerful hardware, for example, when compared to mapping workstations and the like. Likewise, remote operation systems may also include mapping display systems to operate the vehicle from a remote location. These display systems may be portable, and may also include less powerful hardware when compared to, for example, mapping workstations. In manned operating modes, a human operator may apply human input to direct certain operations. For example, the vehicle may be driven to provide for certain operations, such as planting seeds, gathering crops, navigating through certain field obstacles, and so on.

The mapping display system may provide for visual information used during operations of the vehicle. For example, a map may be displayed, showing a variety of overlay information including a representation of the vehicle (e.g., vehicle icon), compass heading, speed, operating details (e.g., engine power, miles per gallon), details of implements being used (e.g., planter details, baler details, tiller details, and the like). In certain embodiments, mapping information may be cached or otherwise stored in tiles, for example, at different levels of detail (e.g., different resolutions). Tile caching may provide for increased rendering speed and improved level of detail even when executed by less powerful hardware such as those found as part of in-vehicle systems and remote operations systems.

The techniques described herein may include novel dynamic tile caching techniques were tiles may expire and be subsequently reconstructed based on certain vehicle operating conditions (e.g., vehicle location, speed), sensor data, and/or implement operation conditions, as opposed to tiles expiring after a certain time (e.g., one month). Tiles may be "tagged" with various data, including vehicle data, sensor data, implement data, and so on with the location at which the data was recorded. This tagging may create a record of operations and may be useful in a variety of visualization and analysis. In certain embodiments, a tile having the highest resolution may be the tagged tile, thus providing for high granularity of visualization. Tiles may be rasterized, and/or include vector information. Accordingly, tile techniques may be combined with polygon-based techniques, for example, to provide for visualizations that may include increased visual details and perspectives but use less computing resources.

Turning now to FIG. 1, the figure is a schematic diagram of an embodiment of a vehicle 10 towing an agricultural implement 12 within an agricultural field 14. The vehicle 10 may additionally include in-vehicle cab suitable for human operation. Further, the vehicle 10 may be remotely operated in addition to or alternative to being driven by a driver inside of the cab. The vehicle may also include automatic steering (e.g., autoguidance), where a human operator may ride in the cab operating throttle and brakes while the vehicle 10 steers automatically. While in the depicted embodiment, the vehicle 10 is depicted as an agricultural tractor, in other embodiments, the vehicle 10 may be a construction vehicle, a mining vehicle, a passenger vehicle, or the like. The tractor 10 or other prime mover is configured to tow the agricultural implement 12 throughout the field 14 along a direction of travel 16. In certain embodiments, the tractor 10 is steered (e.g., via a teleoperator, in-vehicle operator, or an automated system) to traverse the field along substantially parallel rows 18. However, it should be appreciated that the tractor 10 may be steered to traverse the field along other routes (e.g., along a spiral paths, curved paths, obstacle avoidance paths, and so on) in alternative embodiments. As will be appreciated, the agricultural implement 12 may be any suitable implement for performing agricultural operations throughout the field 14. For example, in certain embodiments, the agricultural implement 12 may be a tillage tool, a fertilizer application tool, a seeding or planting tool, or a harvesting tool, among others. While the agricultural implement 12 is towed by the tractor 10 in the illustrated embodiment, it should be appreciated that in alternative embodiments, the agricultural implement may be integrated within the tractor 10. As described earlier, it should be noted that the techniques describe herein may be used for operations other than agricultural operations. For example, mining operations, construction operations, automotive operations, and so on.

As the tractor 10 and the agricultural implement 12 traverse the field, the tractor 10 and the agricultural implement 12 may encounter various field and/or soil conditions, as well as certain structures. Such field and/or soil conditions and structures may be defined as features for purposes of the description herein. For example, the tractor 10 and the agricultural implement 12 may encounter features such as a pond 20, a tree stand 22, a building, fence, or other standing structure 24, transport trailer 26, and miscellaneous features 28, inclines, muddy soil, and so on. The miscellaneous features 28 may include water pumps, above ground fixed or movable equipment (e.g. irrigation equipment, planting equipment), and so on. In certain embodiments, the tractor 10 includes a mapping system used to operate in the field 14. The mapping system may be communicatively and/or operatively coupled to a remote operations system 30, which may include a mapping server. The remote operations system 30 may be located geographically distant from the vehicle system 10. It is to be noted that in other embodiments the server is disposed in the vehicle system 10.

In addition to mapping support, in some embodiments the remote operations system 30 may be communicatively coupled to the tractor 10 to provide for control instructions (e.g., wireless control) suitable for operating on the field 14. The field 14 may include a field boundary 32, as well as the various features, such as the pond 20, the tree stand 22, the building or other standing structure 24, the transport trailer 26, wet areas of the field 14 to be avoided, soft areas of the field to be avoided, the miscellaneous features 28, and so on. As the tractor 10 operates, the operator (either in-cab and/or remote operator) may steer to follow a desired pattern (e.g., up and down the field) as well as to avoid obstacles. The mapping system may provide for visualizations during operations that show field 14 features in detail via tile caching. The tile caching may tag sensor data, including vehicle sensors, field sensors, and the like, in certain tags as further described below. Accordingly, the mapping system may provide for detailed views of the field 14 and field 14 features, which may also include overlay information related to vehicle and/or implement operations.

Figure 2:
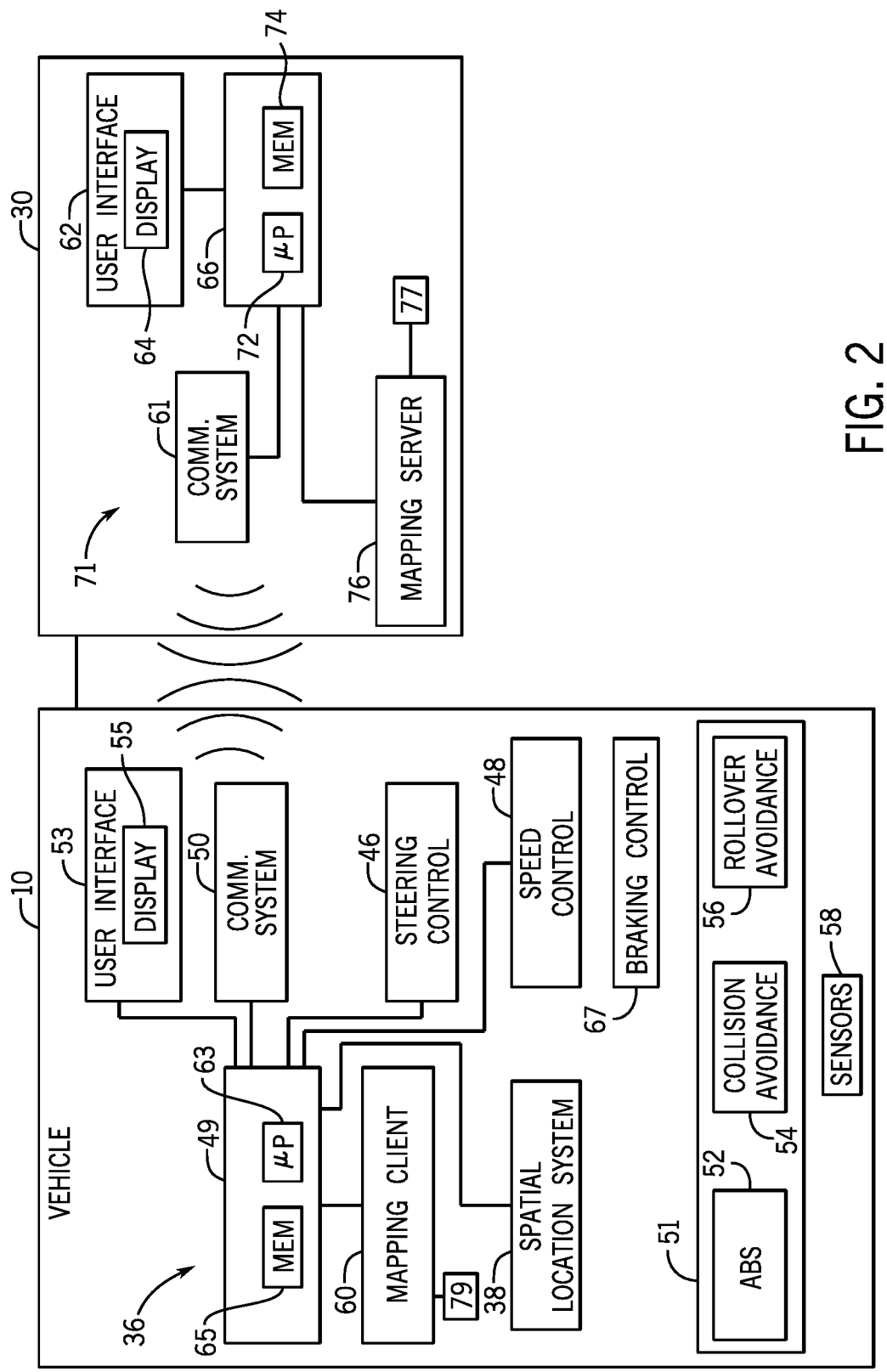
FIG. 2 is a block diagram of an embodiment of computing systems for the agricultural vehicle of FIG. 1, and for a remote operations system.

It may be useful to illustrate a system that may be used provide for mapping details during operations of the agricultural vehicle 10. Accordingly, and turning now to FIG. 2, the figure is a schematic diagram of an embodiment of a control system 36 that may be employed by the operator viewing a map to control operations of the agricultural vehicle 10 of FIG. 1. In the illustrated embodiment, a control system 36 includes a spatial location system 38, which is mounted to the agricultural vehicle 10 and configured to determine a position, and in certain embodiments a velocity, of the agricultural vehicle 10. As will be appreciated, the spatial location system 38 may include any suitable system configured to measure and/or determine the position of the autonomous agricultural vehicle 10, such as a global positioning system (GPS) receiver, for example, and/or GLO-NASS or other similar system. The spatial location system 38 may additionally use real time kinematic (RTK) techniques to enhance positioning accuracy.

In the illustrated embodiment, the control system 36 includes a steering control system 46 configured to control a direction of movement of the agricultural vehicle 10, and a speed control system 48 configured to control a speed of the agricultural vehicle 10. In addition, the control system 36 includes a controller 49, which is communicatively coupled to the spatial locating device 38, to the steering control system 46, and to the speed control system 48. The controller 49 is configured to receive inputs via a communications system 50 to control the agricultural vehicle during certain phases of agricultural operations. The controller 49 may also be operatively coupled to certain vehicle protection systems 51, such as an automatic braking system 52, a collision avoidance system 54, a rollover avoidance system 56, and so on. The vehicle protection systems 51 may be communicatively coupled to one or more sensors 58, such as cameras, radar, stereo vision, distance sensors, lasers, inclinometers, acceleration sensors, speed sensors, and so on, suitable for detecting objects, distances to objects, speeds, temperatures, vehicle inclination (e.g., slope), and the like. The sensors 58 may also be used by the controller 49 for driving operations, for example, to provide for collision information, speed, acceleration, braking information, and the like. The sensors 58 may also include fuel level sensors, engine operations sensors (engine revolutions per minute sensors, engine temperature sensors, engine power calculation sensors, and the like).

Also shown is a mapping client system 60 that may provide for certain visualizations useful in field 14 operations. For example, the mapping client system 60 may be communicatively coupled to a user interface system 53 having a display 55 and provide visual maps as well as certain information overlaid and/or adjacent to the maps. The mapping client system 60 may be communicatively coupled to a mapping server system 76. In certain embodiments, the mapping server 76 may provide mapping tiles for use by the mapping client system 66. For example, the mapping server system 76 may derive and/or store mapping tiles in a tile cache 77, and the mapping client system 60 may use a subset of the mapping tiles stored in the tile cache 77 to store a in local tile cache 79 to present mapping information via the display 55. The mapping server 76 may be disposed in the vehicle 10 as an in-vehicle system. When disposed inside the vehicle, the mapping server 76 may be communicatively coupled to the mapping client system 60 via wired conduits and/or via wireless (e.g., WiFi, mesh networks, and so on). In some cases, the mapping server 76 may be used by more than one client (e.g., more than one vehicle, regardless of whether the mapping server 76 is disposed inside of the vehicle or at the remote location 30.

In certain embodiments, the controller 49 is an electronic controller having electrical circuitry configured to process data from the spatial locating device 38, the vehicle protection systems 51, the sensors 68, and/or other components of the control system 36. In the illustrated embodiment, the controller 49 includes a processor, such as the illustrated microprocessor 63, and a memory device 65. The controller 49 may also include one or more storage devices and/or other suitable components. The processor 63 may be used to execute software, such as software for controlling the agricultural vehicle, software for determining vehicle orientation, software to perform steering calibration, and so forth. Moreover, the processor 63 may include multiple microprocessors, one or more "general-purpose" microprocessors, one or more special-purpose microprocessors, and/or one or more application specific integrated circuits (ASICS), or some combination thereof. For example, the processor 63 may include one or more reduced instruction set (RISC) processors.

The memory device 65 may include a volatile memory, such as random access memory (RAM), and/or a nonvolatile memory, such as read-only memory (ROM). The memory device 65 may store a variety of information and may be used for various purposes. For example, the memory device 65 may store processor-executable instructions (e.g., firmware or software) for the processor 63 to execute, such as instructions for controlling the agricultural vehicle, instructions for determining vehicle orientation, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., position data, vehicle geometry data, etc.), instructions (e.g., software or firmware for controlling the agricultural vehicle, etc.), and any other suitable data.

In certain embodiments, the steering control system 46 may rotate one or more wheels and/or tracks of the agricultural vehicle (e.g., via hydraulic actuators) to steer the agricultural vehicle along a desired route (e.g., as guided by a remote operator using the remote operations system 30). By way of example, the wheel angle may be rotated for front wheels/tracks, rear wheels/tracks, and/or intermediate wheels/tracks of the agricultural vehicle, either individually or in groups. A braking control system 67 may independently vary the braking force on each lateral side of the agricultural vehicle to direct the agricultural vehicle along a path. Similarly, torque vectoring may be used differentially apply torque from an engine to wheels and/or tracks on each lateral side of the agricultural vehicle, thereby directing the agricultural vehicle along a path. In further embodiments, the steering control system 46 may include other and/or additional systems to facilitate directing the agricultural vehicle along a path through the field.

In certain embodiments, the speed control system 48 may include an engine output control system, a transmission control system, or a combination thereof. The engine output control system may vary the output of the engine to control the speed of the agricultural vehicle. For example, the engine output control system may vary a throttle setting of the engine, a fuel/air mixture of the engine, a timing of the engine, other suitable engine parameters to control engine output, or a combination thereof. In addition, the transmission control system may adjust gear selection within a transmission to control the speed of the agricultural vehicle. Furthermore, the braking control system may adjust braking force, thereby controlling the speed of the agricultural vehicle. In further embodiments, the speed control system may include other and/or additional systems to facilitate adjusting the speed of the agricultural vehicle.

The systems 46, 48, and/or 67 may be remotely controlled by a human operating the vehicle 10 inside a cab or via remote operations, e.g., by using the user interface 62 at a remote location. It is to be noted that remote control may include control from a location geographically distant to the vehicle 10 but may also include control where the human operator may be besides the vehicle 10 and may observe the vehicle 10 locally during operations.

In certain embodiments, the control system 36 may also control operation of the agricultural implement 12 coupled to the agricultural vehicle 10. For example, the control system 36 may include an implement control system/implement controller configured to control a steering angle of the implement 12 (e.g., via an implement steering control system having a wheel angle control system and/or a differential braking system) and/or a speed of the agricultural vehicle/implement system 12 (e.g., via an implement speed control system having a braking control system). The mapping client system 60 and/or mapping server system 76 may provide visual information showing both the vehicle 10 and the agricultural implement 12 in a mapping region. In such embodiments, the control system 36 may be communicatively coupled to the implement control system/controller on the implement 12 via a communication network, such as a controller area network (CAN bus). Such control may also be provided remotely via a remote operator.

The user interface 53 is configured to enable an operator (e.g., inside of the vehicle 10 cab or standing proximate to the agricultural vehicle 10 but outside the cab) to control certain parameter associated with operation of the agricultural vehicle. For example, the user interface 53 may include a switch that enables the operator to configure the agricultural vehicle for or manual operation. In addition, the user interface 53 may include a battery cut-off switch, an engine ignition switch, a stop button, or a combination thereof, among other controls. In certain embodiments, the user interface 53 includes a display 56 configured to present information to the operator, such as a map with visual representation of certain parameter(s) associated with operation of the agricultural vehicle (e.g., engine power, fuel level, oil pressure, water temperature, etc.), a visual representation of certain parameter(s) associated with operation of an implement coupled to the agricultural vehicle (e.g., seed level, penetration depth of ground engaging tools, orientation(s)/position(s) of certain components of the implement, etc.), or a combination thereof, In certain embodiments, the display 55 may include a touch screen interface that enables the operator to control certain parameters associated with operation of the agricultural vehicle and/or the implement.

In the illustrated embodiment, the control system 36 may include manual controls configured to enable an operator to control the agricultural vehicle while remote control is disengaged. The manual controls may include manual steering control, manual transmission control, manual braking control, or a combination thereof, among other controls. In the illustrated embodiment, the manual controls are communicatively coupled to the controller 49. The controller 49 is configured to disengage automatic control of the agricultural vehicle upon receiving a signal indicative of manual control of the agricultural vehicle. Accordingly, if an operator controls the agricultural vehicle manually, the automatic control terminates, thereby enabling the operator to control the agricultural vehicle.

In the illustrated embodiment, the control system 36 includes the communications system 50 communicatively coupled to the controller 44. In certain embodiments, the communications system 50 is configured to establish a communication link with a corresponding communications system 61 of the remote operations system 30, thereby facilitating communication between the remote operations system 30 and the control system 36 of the autonomous agricultural vehicle. For example, the remote operations system 30 may include a control system 71 having the user interface 62 having a display 64 that enables a remote operator to provide instructions to a controller 66 (e.g., instructions to initiate control of the agricultural vehicle 10, instructions to remotely drive the agricultural vehicle, instructions to direct the agricultural vehicle along a path, instructions to command the steering control 46, braking control 67, and/or speed control 48, instructions to, etc.). For example, joysticks, keyboards, trackballs, and so on, may be used to provide the user interface 62 with inputs used to then derive commands to control or otherwise drive the vehicle 10 remotely.

In the illustrated embodiment, the controller 66 includes a processor, such as the illustrated microprocessor 72, and a memory device 74. The controller 66 may also include one or more storage devices and/or other suitable components. The processor 72 may be used to execute software, such as software for controlling the agricultural vehicle 10 remotely, software for determining vehicle orientation, software to perform steering calibration, and so forth. Moreover, the processor 72 may include multiple microprocessors, one or more "general-purpose" microprocessors, one or more special-purpose microprocessors, and/or one or more application specific integrated circuits (ASICS), or some combination thereof. For example, the processor 50 may include one or more reduced instruction set (RISC) processors.

The memory device 74 may include a volatile memory, such as random access memory (RAM), and/or a nonvolatile memory, such as read-only memory (ROM). The memory device 74 may store a variety of information and may be used for various purposes. For example, the memory device 74 may store processor-executable instructions (e.g., firmware or software) for the processor 72 to execute, such as instructions for controlling the agricultural vehicle 10 remotely, instructions for determining vehicle orientation, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., position data, vehicle geometry data, etc.), instructions (e.g., software or firmware for controlling the agricultural vehicle, mapping software or firmware, etc.), and any other suitable data.

The communication systems 50, 61 may operate at any suitable frequency range within the electromagnetic spectrum. For example, in certain embodiments, the communication systems 50, 61 may broadcast and receive radio waves within a frequency range of about 1 GHz to about 10 GHz. In addition, the communication systems 50, 61 may utilize any suitable communication protocol, such as a standard protocol (e.g., Wi-Fi, Bluetooth, etc.) or a proprietary protocol.

Figure 3:
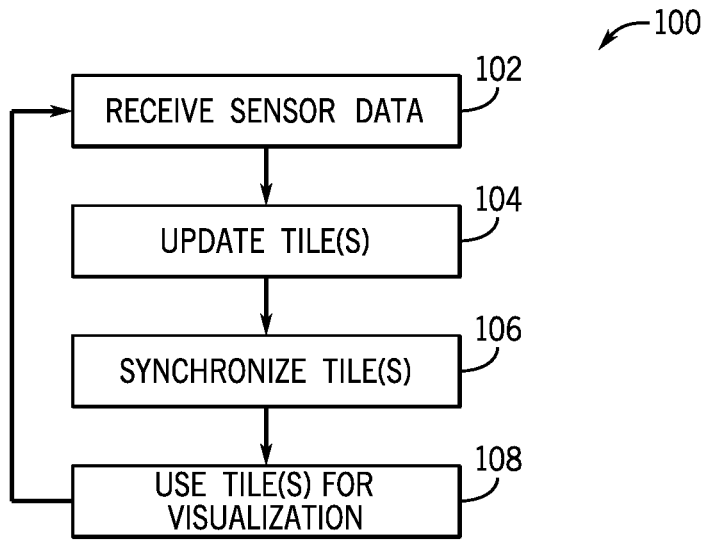
FIG. 3 is a flowchart of an embodiment of a process suitable for providing mapping support.

FIG. 3 is a flowchart of an embodiment of a process 100 suitable for providing mapping support during operations of the vehicle 10 and/or implement 12. The process 100 may be implemented as computer code or instructions executable via the mapping client system 60 and/or the mapping server system 76 (e.g., executable via the processors 63, 72 and stored in the memories 65, 74). In the depicted embodiment, the process 100 may first receive (block 102) input data via sensors, such as the sensors 58. As mentioned above, the input data may include seed planting data (e.g., vehicle is planting seed, type of seed, amount of seed being planted), crop harvesting data (e.g., type of crop, amount of crop being harvested), field 14 condition data (e.g., ground humidity, ground pH), vehicle operations data (e.g., vehicle speed, vehicle acceleration, vehicle location, vehicle direction of travel, fuel level, engine power, wheel slip, engine revolutions per minute sensors, engine temperature sensors, and so on), implement operations data (e.g., type of implement, implement speed, implement height off the ground, harvesting rates, tilling rates, planting rates, and so on).

The input data received (block 102) may then be used to update (block 104) tile cache(s), such as tile cache 77 and/or tile cache 79. Tiles may be stored at different levels of detail in caches 77, 79. For example, a single tile stored at level 0 may cover the entire field 14. The coarse level 0 tile may be stored in a raster graphics format (e.g., BMP, PNG, JPEG, GIF, Exif). Tiles stored in the raster format may be found at levels 0-n. Tiles at levels n+1 to m may be stored in a vector graphics format (e.g., SVG, DXF, WMF, EPS). The tiles stored at level m may include the highest resolution views for the field 14. That is, as levels increase from 0 to m, the resolution for the tiles increase. While at level 0 a single tile may visualize the entire field 14, at level m multiple tiles may be used to visualize the field 14, such as thousands of tiles or more.

The update (block 104) for the tiles may update a tile having a higher resolution level (e.g., level m) and the updated tile may then be used to update lower resolution or detail tiles (e.g., levels 0 to m−1). For example, sensor data may be used to update visual features that show lanes that have now been planted, seed disposition amounts, crop lanes that have now been harvested, harvested amounts, and so on. The process 100 may also synchronize (block 106) tile caches 77 and 79. For example, the process 100 may determine that the vehicle 10 and/or implement 12 has moved to a new location and determine that tiles in the title cache 77 corresponding to the new location are older than sensor data or data in equivalent tiles in the tile cache 79. Accordingly, the tiles for the new location may be updated and/or replaced by using tiles in the tile cache 79, thus synchronizing the tile cache 77 to more equivalently correspond to the tile cache 79 or a subset of the tile cache 79. In some embodiments, the tiles in tile cache 77 may be updated locally via the mapping client system 60 and then transmitted over to the tile cache 79 for synchronization, thus providing for either a one-way synchronization (from server to client) and/or a two-way synchronization (from server to client and from client to server).

Tiles in the cache 77 and/or 79 may then be used (block 108) for visualization. For example, the user may cross from one tile boundary into another tile boundary and the new updated, synchronized tile may then be presented for visualization. The user may also zoom in/out of certain regions and tiles may then be presented for visualization corresponding to the regions of interest. Higher levels (e.g., bird's eye view of the field 14) may use coarse tiles or even a single tile at level 0, while more zoomed in views of the field 14 may use tiles at higher levels, up to level m. By having updated, synchronized tiles already in a cache (e.g., cache 77, 79) the techniques described herein may enable fast, high detail level zoom of various geographic regions (e.g., field 14) while providing for accurate and timely information (e.g., current field condition, current farmed lanes, planting operations, harvesting operations, and the like).

Figure 4:
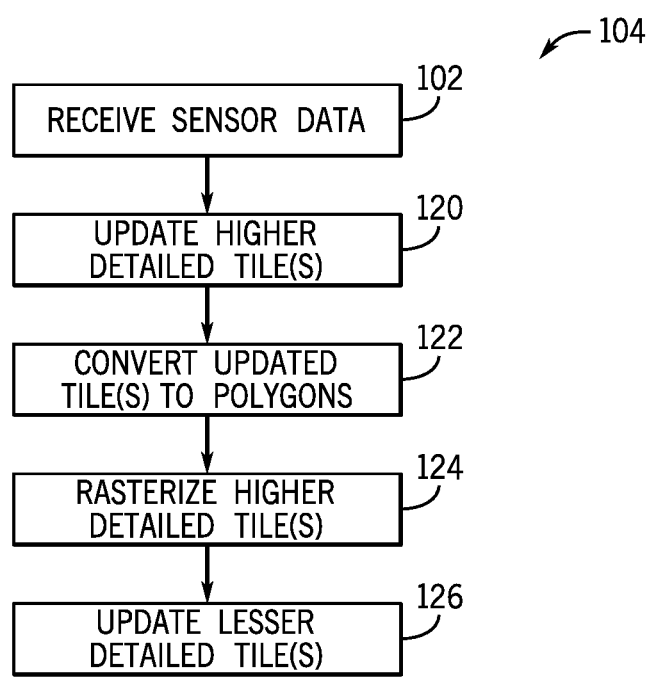
FIG. 4 is a flowchart showing an embodiment of an update block.

It may be beneficial to describe an embodiment of the update block 104 showing more detail. Turning now to FIG. 4, the figure is a flowchart showing an embodiment of the update block 104 describing further details. In the depicted embodiment, after receiving (block 102) sensor data, the update process 104 may then update higher detailed tile(s) (block 120). That is, the update block 104 may find the tile(s) at the highest level of detail, e.g., level m, and the tiles at level may would be updated to show, for example, a planting "lane" on the map, type of planting, amount of seed used, seed dispersion, and so on. Harvestings may also be updated to show a harvesting lane, an amount harvested, type of crop harvested, weight of crop harvested, and so on. The update tiles may be persistently stored in the mapping server 76 in a vector format.

The updated tiles may then be converted (block 122) into polygons. For example, each of the updated tile(s) may be dividing into polygons that together represent the update tile(s) visually. For example, vector data may be converted (block 122) into polygons. The update block 104 may then temporarily rasterize (block 124) the higher detailed tile(s), for example, by using the polygons to derive raster formatted tiles. The rasterized tiles may be sent, for example, to a graphics processing unit (GPU) for display via the display 55. The updated tiles may be rasterized (block 124) but not stored persistently, and used instead for GPU consumption.

The update block 104 may then update (block 126), all lesser detailed tile(s), e.g., tiles at level 0-m−1. The update may persistently rasterize lesser detailed tile(s) and store the updated, rasterized tiles in the mapping server 76. It is also to be noted that the update block 104 may log the sensor data received (block 102) and tag the sensor data with tile information (e.g., location information) persistently. Indeed, all data received via sensors 58 may be tagged and stored so that, for example, analysis may then be performed on miles per gallon metrics obtained during vehicle 10 operations (e.g., harvesting mpg, planting mpg), speeds used, tracks taken through the field 14, wheel slip, engine power, cross track error(s), engine parameters, implement 12 parameters, and so on.

Figure 5:
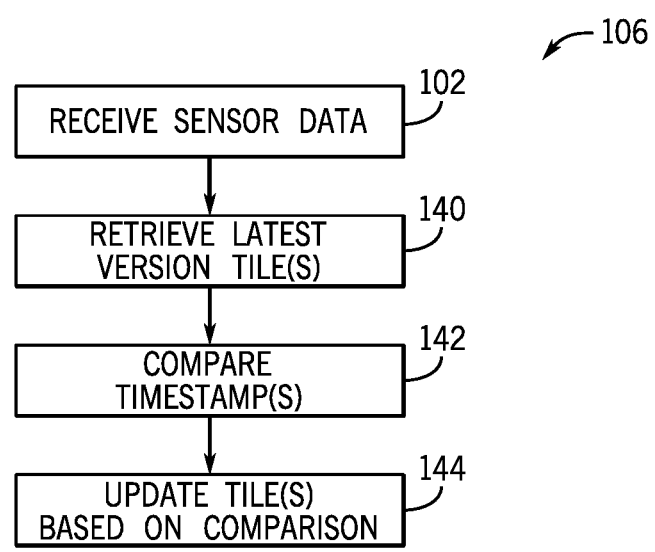
FIG. 5 is a flowchart showing an embodiment of the synchronize block.

FIG. 5 is a flowchart showing an embodiment of the synchronize block 106 describing further details. In the depicted embodiment, after receiving (block 102) sensor data, the synchronize block 106 may retrieve (block 140) the latest version of a tile (e.g., most recent version of a tile) to display, for example, the vehicle 10 and/or implement 12 on the tile. For example, when the vehicle 10 moves to a different tile, the mapping client 60 may retrieve (block 140) the latest tile version. Likewise, when starting up, the mapping client 60 may retrieve (block 140) the latest tile version.

The synchronize block 106 may compare (block 142) a timestamp of the most current tile with a timestamp of, for example, of sensor data being received. If the sensor data's timestamp is more recent, the synchronize block 106 may then update (block 144) the tile to include the more recent sensor data, including logging and tagging the sensor data with the tile, and then continue the update process as shown above with respect to the update block 104. Unlike traditional tiles that have a cache expiration based on time (e.g., expire a tile every month), the techniques described herein may expire a tile based on sensor data received every millisecond, every second, every few seconds, every minute, and so on.

Figure 6:
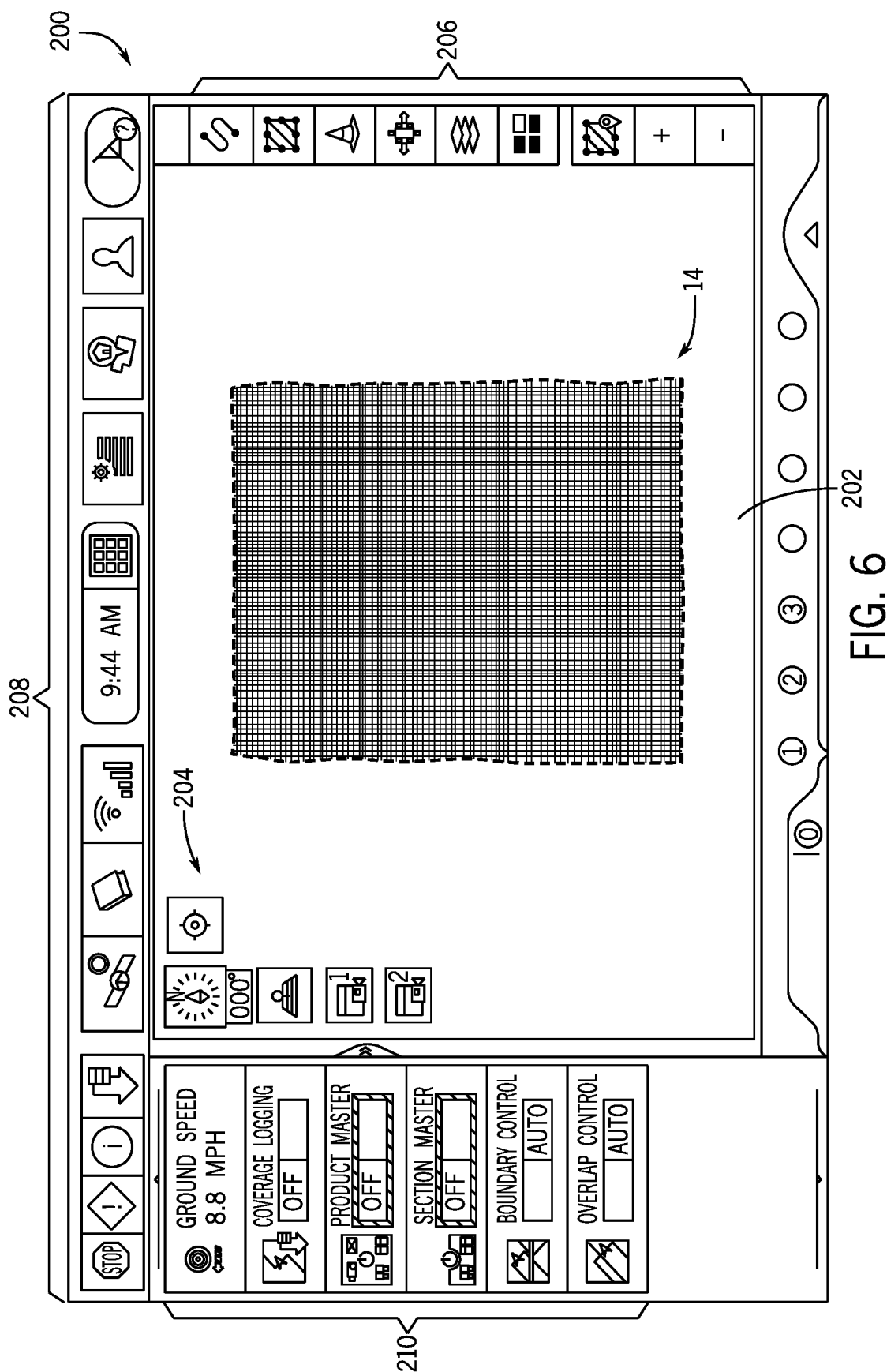
FIGS. 6-9 illustrate embodiments of various screenshots having tile data.
Figure 7:
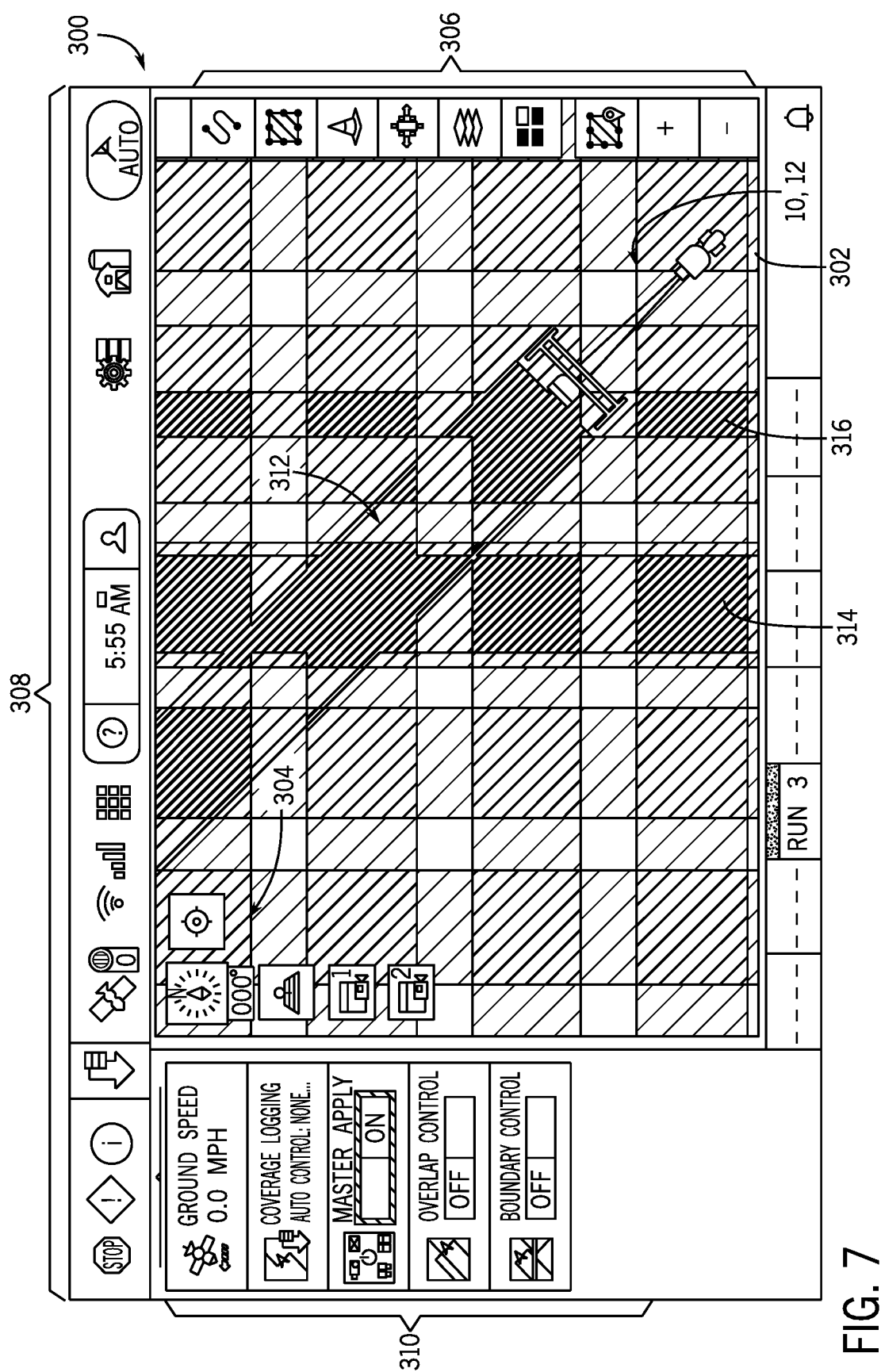

It may be useful to describe visual presentation of the tile data. Accordingly, FIGS. 6-9 illustrate embodiments of various screenshots having tile data. For example, FIG. 6 illustrates an embodiment of a screenshot 200 that may be presented via the displays 55 and/or 64 to provide for tile mapping visualizations. In the depicted embodiment, the field 14 is illustrated at a high level showing the entire field in a view 202. A single tile at level 0 may be used to visualize the field 14 in the view 202. The screenshot 200 also illustrates certain icons 204 displayed inside the view 202 that may include compass direction of travel, as well as recording buttons to record certain operations, e.g., driving operations. The screenshot 200 also shows controls 206 on a right side of the view 202 that may be used to zoom in/out, change levels, annotate the view 202, and so on. Controls 208 may be used to view certain information, e.g., satellite information, time information, provide certain further controls, and the like. Controls 210 may be similarly used to display a ground speed for the vehicle 10, as well to provide for further control, e.g., boundary control, overlap control, and so on. The user (e.g., driver) may then zoom in to a high detailed view, as shown in FIG. 7.

More specifically, FIG. 7 illustrates an embodiment of a screenshot 300 showing a view 302 at a high level of detail. In the depicted view 302, the vehicle 10 is shown towing the implement 12. In this view, a tile at highest level m may be used to display more details, such as a lane 312 currently being operated (e.g., tilled) on the field 14, as well as previously navigated lanes 314, 316. As in the previous figure, the screenshot 300 also illustrates certain icons 304 displayed inside the view 302 that may include compass direction of travel, as well as recording buttons to record certain operations, e.g., driving operations. The screenshot 300 also shows controls 306 on a right side of the view 302 that may be used to zoom in/out, change levels, annotate the view 302, and so on. Controls 308 may be used to view certain information, e.g., satellite information, time information, provide certain further controls, and the like. Controls 310 may be similarly used to display a ground speed for the vehicle 10, as well to provide for further control, e.g., boundary control, overlap control, and so on.

Figure 8:
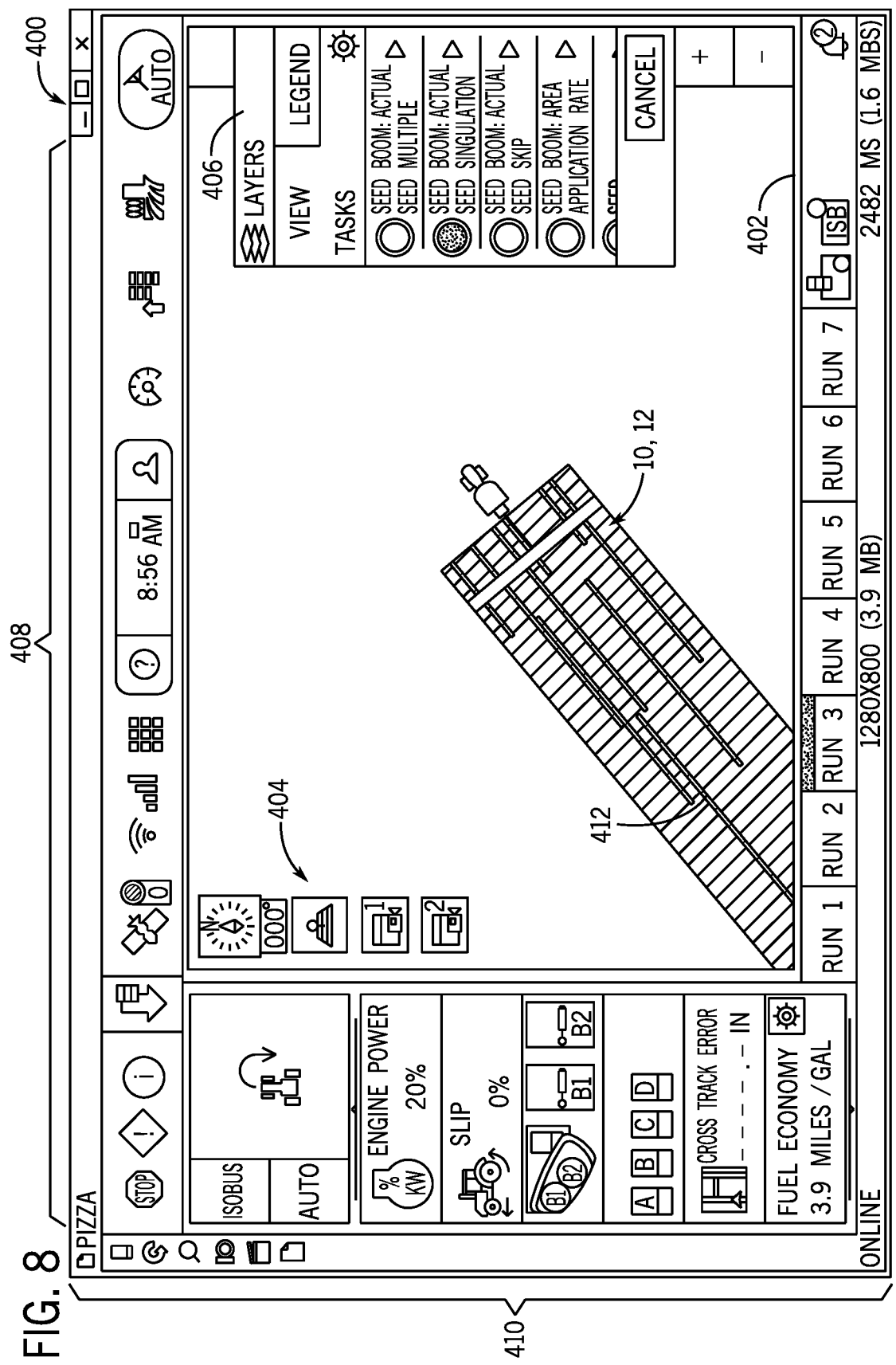

Turning now to FIG. 8, the figure illustrates an embodiment of a screenshot 400 showing a view 402 of the vehicle 10 and implement 12 on the field 14. In the depicted embodiment, icons 404 shown may be used to display compass direction of travel, as well as recording buttons to record certain operations, e.g., driving operations, among other controls. The embodiment also shows a menu 406 that may be used to display certain layers. For example, actual seed singulation is selected in the menu 406 and displayed as seed singulation 412. Also shown are controls 408 that may be used to view certain information, e.g., satellite information, time information, provide certain further controls, and the like. Controls 410 on a right side of the view 402 may be used to display engine power, wheel slip, fuel economy (e.g., MPG), and the like.

Figure 9:
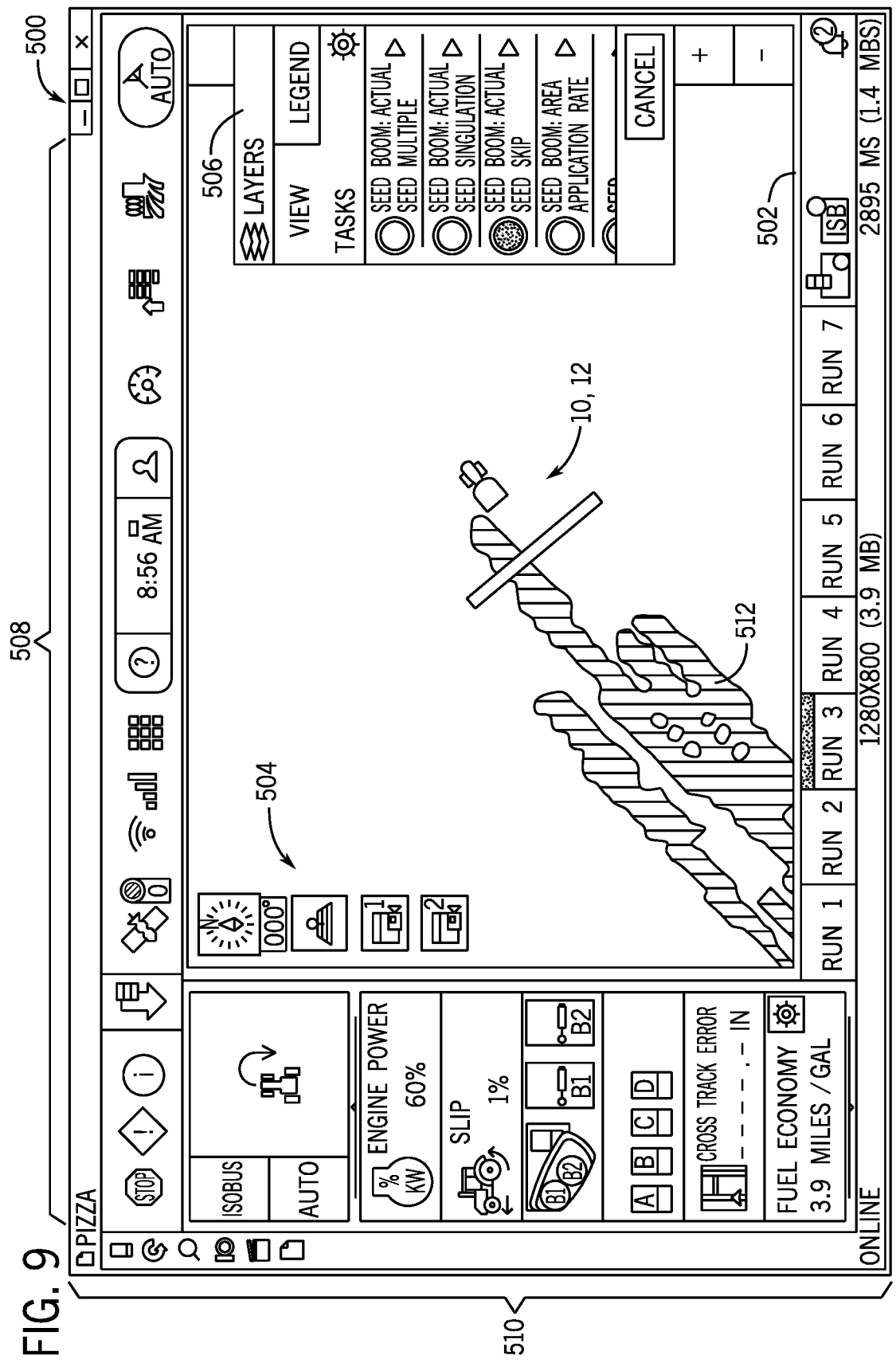

FIG. 9 illustrates an embodiment of a screenshot 500 showing a view 502 of the vehicle 10 and implement 12 on the field 14. In the depicted embodiment, icons 504 shown may be used to display compass direction of travel, as well as recording buttons to record certain operations, e.g., driving operations, among other controls. The embodiment also shows a menu 506 like the menu 406 of the figure above that may be used to display certain layers. For example, actual seed skip is selected in the menu 506 and displayed as seed skip 512. Also shown are controls 508 that may be used to view certain information, e.g., satellite information, time information, provide certain further controls, and the like. Controls 510 on a right side of the view 402 may be used to display engine power, wheel slip, fuel economy (e.g., MPG), and the like.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a vehicle system, comprising:
at least one sensor;
a mapping server system comprising a processor communicatively coupled to a mapping client system, wherein the mapping server system is configured to:
receive a signal from the at least one sensor;
update a mapping tile disposed in a tile cache to derive an updated mapping tile based on the signal; and
visually display the updated mapping tile to an operator of the vehicle system, wherein the mapping server system is configured to update the mapping tile by updating a highest level of detail mapping tiles stored in the tile cache and then updating lesser level of detail mapping tiles stored in the tile cache, wherein the updating the highest level of detail mapping tiles comprises converting the highest level of detail mapping tiles into polygons.

2. The system of claim 1, wherein the vehicle system comprises an agricultural vehicle and wherein the signal is representative of a planting operation, or of a harvesting operation.

3. The system of claim 1, wherein the mapping server system is configured to update the mapping tile by comparing a tile timestamp of the mapping tile to a sensor timestamp of the signal and to update the mapping tile when the sensor timestamp is newer than the tile timestamp.

4. The system of claim 1, wherein the mapping server system is configured to rasterize the polygons after converting to derive rasterized highest level of detail mapping tiles to be used by a graphics processor unit (GPU) of the mapping client system.

5. The system of claim 1, wherein the mapping client system is configured to synchronize a mapping client tile cache based on the update of the mapping tile.

6. The system of claim 1, wherein the mapping server is configured to log sensor data based on the signal and to tag the sensor data to one or more mapping tiles of the tile cache.

7. The system of claim 1, wherein the at least one sensor comprises at least one of a fuel sensor, an engine power sensor, a radar, a stereo vision sensor, a distance sensor, a laser, an inclinometer, an acceleration sensors, a speed sensor, a fuel level sensors, an engine operations sensors, a planting sensor, or a harvesting sensor.

8. A method, comprising:
receiving, via a mapping server system included in a vehicle system, a signal from at least one sensor disposed in the vehicle system, wherein the mapping server system comprises a processor;
updating a mapping tile disposed in a tile cache to derive an updated mapping tile based on the signal; and
visually display, via a mapping client system, the updated mapping tile to an operator of the vehicle system, wherein the mapping server system is communicatively coupled to the mapping client system, wherein updating the mapping tile comprises updating a highest level of detail mapping tiles stored in the tile cache and then updating lesser level of detail mapping tiles stored in the tile cache, wherein the updating the highest level of detail mapping tiles comprises converting the highest level of detail mapping tiles into polygons, rasterizing the polygons into rasterized mapping tiles for use via a graphics processor unit (GPU) of the mapping client system.

9. The method of claim 8, further comprising one of planting or harvesting using the vehicle system, wherein the signal is representative of a planting operation, or of a harvesting operation.

10. The method of claim 8, wherein updating the mapping tile comprises only updating the mapping tile when the signal comprises a signal timestamp newer than a timestamp of the mapping tile.

11. The method of claim 8, wherein the mapping server system is communicatively coupled to a second mapping client system to provide the updated mapping tiles to the second mapping client, and wherein the second mapping client is disposed in a second vehicle system.

12. A non-transitory computer readable medium comprising instructions that when executed by a processor cause the processor to:
receive, via a mapping server system included in a vehicle system, a signal from at least on sensor disposed in the vehicle system;
update a mapping tile disposed in a tile cache to derive an updated mapping tile based on the signal; and
visually display, via a mapping client system, the updated mapping tile to an operator of the vehicle system, wherein the mapping server system is communicatively coupled to the mapping client system, wherein updating the mapping tile comprises updating a highest level of detail mapping tiles stored in the tile cache and then updating lesser level of detail mapping tiles stored in the tile cache, wherein updating the highest level of detail mapping tiles comprises converting the highest level of detail mapping tiles into polygons, rasterizing the polygons into rasterized mapping tiles for use via a graphics processor unit (GPU) of the mapping client system.

13. The non-transitory computer readable medium of claim 12, wherein updating the mapping tile comprises only updating the mapping tile when the signal comprises a signal timestamp newer than a timestamp of the mapping tile.

14. The non-transitory computer readable medium of claim 12, further comprising instructions that when executed by the processor cause the processor to synchronize a mapping client tile cache based on the updated mapping tile.

* * * * *